United States Patent
Phillips et al.

(10) Patent No.: US 8,946,962 B2
(45) Date of Patent: Feb. 3, 2015

(54) ELECTRIC MOTOR FOR HIGH-TEMPERATURE APPLICATIONS

(71) Applicant: Maxon Motor AG, Sachseln (CH)

(72) Inventors: Robin Phillips, Kerns (CH); Kornelia Kunstmann, Hagendorn (CH); Walter Kuhn, Denzlingen (DE)

(73) Assignee: Maxon Motor AG, Sachsein (CH)

( * ) Notice: Subject to any disclaimer, the term of this patent is extended or adjusted under 35 U.S.C. 154(b) by 0 days.

(21) Appl. No.: 13/685,411

(22) Filed: Nov. 26, 2012

(65) Prior Publication Data

US 2013/0134809 A1     May 30, 2013

(30) Foreign Application Priority Data

Nov. 24, 2011   (EP) .................................... 11009321

(51) Int. Cl.
| | | |
|---|---|---|
| *H02K 1/12* | (2006.01) | |
| *H02K 3/47* | (2006.01) | |
| *H02K 3/30* | (2006.01) | |
| *H02K 11/00* | (2006.01) | |
| *H02K 5/128* | (2006.01) | |
| *H02K 3/44* | (2006.01) | |

(52) U.S. Cl.
CPC .. *H02K 3/47* (2013.01); *H02K 3/30* (2013.01); *H02K 11/0094* (2013.01); *H02K 5/128* (2013.01); *H02K 3/44* (2013.01)
USPC ............................................. 310/179; 310/45

(58) Field of Classification Search
USPC ................. 310/71, 179, 194, 43, 45
See application file for complete search history.

(56) References Cited

U.S. PATENT DOCUMENTS

| 4,679,313 | A | | 7/1987 | Schultz et al. |
|---|---|---|---|---|
| 4,852,245 | A | * | 8/1989 | Denk ............................. 29/596 |
| 4,908,347 | A | * | 3/1990 | Denk ........................... 505/166 |
| 4,968,911 | A | * | 11/1990 | Denk ..................... 310/216.007 |
| 5,233,252 | A | * | 8/1993 | Denk ..................... 310/216.106 |
| 6,489,697 | B1 | | 12/2002 | Ozawa et al. |
| 6,943,479 | B2 | * | 9/2005 | Laurent et al. ................ 310/412 |
| 2007/0267934 | A1 | | 11/2007 | Fukushima et al. |
| 2010/0045121 | A1 | * | 2/2010 | Roopnarine .................... 310/46 |
| 2010/0187940 | A1 | * | 7/2010 | Yamamoto et al. ........... 310/201 |
| 2010/0301713 | A1 | * | 12/2010 | Breuning et al. .......... 310/68 C |
| 2010/0308683 | A1 | | 12/2010 | Horng et al. |
| 2011/0012468 | A1 | | 1/2011 | Horng et al. |

FOREIGN PATENT DOCUMENTS

| EP | 0 193 929 A2 | 9/1986 |
|---|---|---|
| EP | 1 833 142 A1 | 9/2007 |
| EP | 2 135 567 A1 | 12/2009 |

OTHER PUBLICATIONS

European Search Report for EP 11009321 dated Feb. 2, 2012.

\* cited by examiner

*Primary Examiner* — Dang Le
(74) *Attorney, Agent, or Firm* — Buchanan Ingersoll & Rooney PC

(57) ABSTRACT

An electric motor for high-temperature applications. The electric motor includes a rotor and a stator with a hollow-cylindrical, ironless stator winding of stoved-enamel wire. Furthermore, a soft-magnetic return is provided which encloses the stator winding. The stator winding is supported by a hollow-cylindrical supporting sleeve lying radially inside against the stator winding.

16 Claims, 1 Drawing Sheet

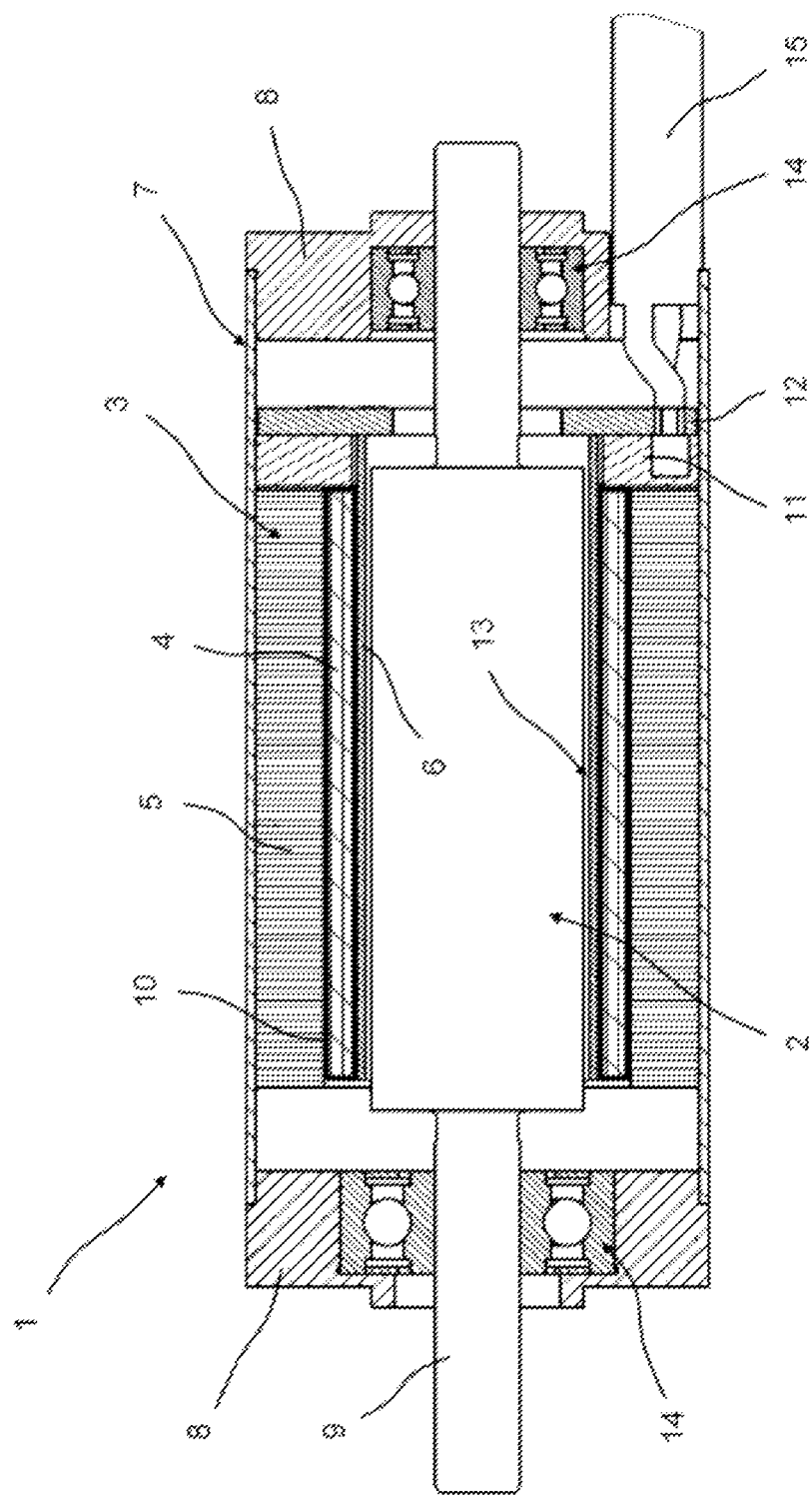

ELECTRIC MOTOR FOR HIGH-TEMPERATURE APPLICATIONS

The present invention relates to an electric motor for high-temperature applications according to the preamble of independent claim 1. Such an electric motor comprises a rotor and a stator with a hollow-cylindrical, ironless stator winding of stoved-enamel wire and with a soft-magnetic return enclosing the stator winding.

Possible applications of such electric motors which have to resist high temperatures are found, for example, in the fields of aerospace, vehicle and aircraft construction, the extraction and processing of raw materials, in particular in the oil industry in test and prospecting drilling for oil and natural gas, and in power plant technology.

From prior art, electric motors for high-temperature applications are known whose stator winding is not wound onto a slotted core stack but is designed as a hollow-cylindrical ironless stator winding. The stator winding normally consists of several rhombic individual windings that overlap in the circumferential direction. The stator winding is here wound from stoved-enamel wire which, after it has cured, takes care that the stator winding remains dimensionally stable. At high temperatures, however, the stoved enamel becomes soft, which can cause the winding to deform. Since the rotor of the electric motors mentioned in the beginning is often designed as internal rotor and enclosed directly by the stator winding, this deformation compromises the observation of a necessary air gap between the internal rotor and the stator winding.

An electric motor of the type mentioned in the beginning is known, for example, from U.S. Pat. No. 6,489,697 B1. There, the hollow-cylindrically designed stator winding is enclosed by an also hollow-cylindrical soft-magnetic return. The stator winding and the return quasi form a unit where an insulation layer is present between the stator winding and the soft-magnetic return. To prevent the stator winding from deforming, both the stator winding and the soft-magnetic return are cooled by an oil circuit. The cooling medium flows in the axial direction past the internal periphery of the stator winding and the outer periphery of the return. For the cooling medium not to contact the internal rotor of the motor, a ceramic sleeve is disposed between the stator winding and the internal rotor which contacts neither the rotor nor the stator winding. The hollow-cylindrical ceramic sleeve defines both the air gap to the internal rotor and the hollow-cylindrical flow channel of the cooling fluid between the ceramic sleeve and the stator winding.

The electric motor known from U.S. Pat. No. 6,489,697 B1 has a relatively complex design and is moreover expensive to manufacture and to operate. Due to the active cooling system, the electric motor must be serviced at regular intervals.

From US 2010/0045121 A1, an electric motor for high-temperature applications is known whose stator comprises a slotted core stack onto which the stator winding is wound. The individual windings of the stator winding are glued to each other by means of an electrically insulating adhesive with a ceramic binder. A hollow-cylindrical, ironless stator winding is not shown. The slotted core stack onto which the stator winding is wound has an essential proportion in the stability of the stator winding.

It is the object of the present invention to improve an electric motor of the type mentioned in the beginning with respect to the stability of the stator winding in particular such that the electric motor can also be employed at temperatures of up to 550° C. The electric motor should nevertheless be of a simple construction and inexpensive to manufacture.

The object is achieved by the features of independent claim 1. Accordingly, a solution according to the invention is given if the stator winding is supported by a hollow-cylindrical supporting sleeve lying radially inside against the stator winding.

The solution according to the invention prevents the stator winding from deforming at high temperatures such that the functionality and safety of the electric motor are compromised. The supporting sleeve provided according to the invention thus takes care that the hollow-cylindrical shape of the stator winding is maintained even at maximum operating temperatures, even if the stoved enamel, which bakes together the individual windings of the stator winding and which ensures the dimensional stability of the stator winding already at low temperatures, already becomes soft and the shape of the stator winding can no longer be maintained in a stable manner already. The invention therefore provides an electric motor which can be even employed at very high temperatures of up to 550° C. or even higher. Here, the invention at the same time offers the advantage that the electric motor can be manufactured quickly, inexpensively and easily, and moreover no time-consuming maintenance works become necessary.

The soft-magnetic return which encloses the stator winding preferably positively lies against the stator winding, ensuring good heat dissipation to the outside. The electric motor preferably also comprises a housing which also directly encloses the soft-magnetic return, so that the housing lies positively against the return. This also ensures an optimal heat dissipation of the waste heat generated in the stator winding. However, it should be pointed out that an additional housing is not absolutely necessary, for example if the soft-magnetic return already forms the outer housing of the electric motor.

Advantageous embodiments of the invention are the subject matter of the subclaims.

In a preferred embodiment of the present invention, the supporting sleeve extends over the complete length of the stator winding. This permits an optimal support of the stator winding, so that the stator winding will maintain its shape even at very high operating temperatures.

In another particularly preferred embodiment of the present invention, the supporting sleeve consists of a ceramic material. Ceramic materials on the one hand offer the advantage of being very stable so that the supporting sleeve can be designed with a very thin wall. Therefore, very little installation space is required for the supporting sleeve provided according to the invention. Furthermore, ceramics also offer the advantage that the supporting sleeve then has a slightly heat-insulating effect. By this, thermal transfer to the outside via the soft-magnetic return and the housing is facilitated. It is simultaneously prevented that the components inside the stator winding, for example a rotor designed as internal rotor, heat up due to the waste heat produced in the stator winding. Ceramic materials are moreover non-magnetic and not magnetisable, preventing the formation of iron losses in the supporting sleeve. A supporting sleeve of ceramic material can moreover be manufactured very quickly and inexpensively. Zirconium oxide showed to be particularly advantageous as ceramic material with respect to the above mentioned purposes.

In a further particularly preferred embodiment of the present invention, the stator winding is additionally coated with a potting compound. The potting compound imparts additional stability to the stator winding and prevents the stoved enamel from volatilizing, i.e. evaporating or liquefying, at very high temperatures. The potting compound is preferably applied at least onto the complete outer casing of the stator winding. A volatilization of the stoved enamel is optimally prevented if the stator winding is coated with the potting compound outside as well as inside.

It is furthermore preferably provided for the stator winding to be fixed to the supporting sleeve by the potting compound. This permits an extremely stable coherence between the stator winding and the supporting sleeve, so that the shape of the stator winding can be optimally ensured by the supporting sleeve.

Furthermore, the potting compound is preferably a ceramic binder or a ceramic adhesive. If a ceramic binder is employed, the fixing of the stator winding to the supporting sleeve is effected by a positive and/or frictional connection. With a ceramic adhesive, fixing is achieved by means of a material connection. Ceramic binders as well as ceramic adhesives are absolutely dimensionally stable at maximum operating temperatures even above 550° C. and can prevent a volatilization of the stoved enamel even at these temperatures. Ceramic binders or ceramic adhesives on the basis of oxide ceramics are particularly suited.

In another preferred embodiment of the present invention, the stator furthermore comprises a winding support which is disposed at a front face of the stator winding and consists of a ceramic material. Thereby, the stator winding can be exactly positioned and held in the electric motor. Preferably, the winding support also consists of zirconium oxide.

In another preferred embodiment of the present invention, the stator winding is of a polyphase design, preferably a three-phase design, wherein the stator furthermore comprises a printed circuit board of a ceramic material for interconnecting the phase windings. By this, a particularly compact and stable arrangement for interconnecting the phase windings is achieved. The electric motor can be particularly easily mounted if the printed circuit board follows the winding support, wherein the supporting sleeve extends over the complete length of the stator winding and the winding support and lies positively against the printed circuit board in the axial direction. This also permits a particularly compact and stable arrangement of the stator.

In another preferred embodiment of the present invention, the rotor of the electric motor is designed as internal rotor. The air gap between the stator and the rotor required for the function of the electric motor can be absolutely stably maintained over a very wide temperature range by the inventive supporting sleeve of ceramics. The supporting sleeve does not appreciably deform even at high temperatures and simultaneously supports the stator winding.

One embodiment of the present invention will be illustrated more in detail below with reference to a drawing.

The FIGURE shows an electric motor according to the invention in a longitudinal section.

The electric motor 1 is designed as internal rotor motor and comprises a rotor 2 and a hollow-cylindrical stator 3 arranged coaxially with respect to the rotor and enclosing the internal rotor 2. The internal rotor 2 is not shown in a section in the representation. The exact construction of the rotor is not shown in further detail. The rotor comprises a permanent magnet or several permanent magnet segments distributed across the circumference. The housing of the electric motor according to the invention in which all parts of the electric motor are accommodated is designated with reference numeral 7 in the representation. It consists of a very simple hollow-cylindrical sleeve, preferably of steel. One housing cover 8 each is provided at either end and seals the housing 7 in the axial direction. Both housing covers 8 contain one ball bearing 14 each for rotatably mounting the shaft 9 of the internal rotor 2.

The stator 3 of the electric motor 1 according to the invention consists of an ironless, hollow-cylindrical stator winding 4 and a soft-magnetic external return 5 consisting of a core stack. The external return 5 is also of a hollow-cylindrical design and encloses the stator winding 4, the external return positively lying against the stator winding 4. The hollow-cylindrical stator winding 4 is wound from a stoved-enamel wire. The stoved enamel is heated and subsequently cured in the manufacture of the stator winding, so that it dimensionally stably holds the winding together at low temperatures. To equip the electric motor for very high operating temperatures, the hollow-cylindrical ceramic supporting sleeve 6 is provided which is disposed within the stator winding 4 coaxially with respect to the latter, the stator winding 4 lying with its inner periphery against the outer periphery of the supporting sleeve 6. The ceramic supporting sleeve 6 consists of zirconium oxide stabilized with yttrium. The ceramic supporting sleeve 6 has such a diameter that the air gap 13 required for ensuring the function of the electric motor remains between the internal rotor 2 and the ceramic sleeve 6. Since the ceramic sleeve 6 remains absolutely dimensionally stable even at highest operating temperatures, it ensures at any time that the stator winding 4 cannot deform such that it comes into contact with the internal rotor 2. The shown electric motor according to the invention is therefore suited for operating temperatures of up to 550° C.

The stator winding 4 is additionally completely coated with a potting compound 10 which consists of a ceramic binder or a ceramic adhesive. The ceramic potting compound is applied both onto the outer periphery and the inner periphery of the stator winding 4. It has several functions. On the one hand, the ceramic potting compound increases the stability of the stator winding 4, in particular at high temperatures. Furthermore, the hollow-cylindrical stator winding 4 is fixed to the hollow-cylindrical supporting sleeve 6 by means of the ceramic potting compound. Finally, the ceramic potting compound also takes care that the stator winding 4 is completely encapsulated, so that the stoved enamel of the winding wire is prevented from volatilizing, e.g. by evaporation or liquefaction, even at high temperatures.

The components each designed to be hollow-cylindrical, namely the stator winding 4, the external return 5 and the housing, are all disposed coaxially with respect to each other and each positively lie against each other. This ensures that the waste heat produced in the stator winding 4 can be optimally eliminated to the outside via the external return 5 and the housing 7. The ceramic supporting sleeve 6 and the air gap 13 between the supporting sleeve 6 and the internal rotor 2 take care that a certain insulation effect to the inside to the rotor 2 is present, so that the internal rotor does not experience much addition of heat from the stator winding 4.

From the right front end of the stator winding 4, an annularly designed winding support 11 is arranged by means of which the stator winding 4 is held in the housing 7 of the electric motor. The winding support 11 axially follows the stator winding 4, while the inner periphery of the winding support 11 does not project to the inside beyond the inner periphery of the stator winding 4. By this, the supporting sleeve 6 can be designed such that it reaches over the complete length of the stator winding and the following winding support 11. The supporting sleeve 6 thus isolates the stator winding 4 and the winding support 11 with respect to the inner rotor 2. The winding support 11 also consists of a ceramic material, namely zirconium oxide, which is stabilized with yttrium. The winding support 11 is followed on the right side by the printed circuit board 12 to which the electric contacts 15 of the electric motor 1 according to the invention lead. Since the stator winding 4 is designed with three phases, the printed circuit board 12 serves to individually interconnect the three phases. As can be seen in the representation, the hollow-cylindrical supporting sleeve 6 positively lies against the printed circuit board 12 with its right front face.

The invention claimed is:

1. Electric motor for high-temperature applications, comprising:
   a rotor; and
   a stator with a hollow-cylindrical, ironless stator winding of a stoved-enamel wire and with a soft-magnetic return enclosing the stator winding,
   wherein the stoved-enamel wire, after it has cured, assures that the stator winding remains dimensionally stable at low temperatures, and
   wherein the stator winding is supported by a hollow-cylindrical supporting sleeve lying radially inside against the stator winding.

2. Electric motor according to claim 1, wherein the supporting sleeve extends over a complete length of the stator winding.

3. Electric motor according to claim 1, wherein the supporting sleeve consists of a ceramic material.

4. Electric motor according to claim 1, wherein the stator winding is additionally coated with a potting compound.

5. Electric motor according to claim 4, wherein the stator winding is fixed to the supporting sleeve by the potting compound.

6. Electric motor according to claim 4, wherein the potting compound is a ceramic binder or a ceramic adhesive.

7. Electric motor according to claim 4, wherein the potting compound is an oxide ceramic.

8. Electric motor according to claim 1, wherein the stator comprises:
   a winding support, wherein the winding support is disposed at a front face of the stator winding and consists of a ceramic material.

9. Electric motor according to claim 8, wherein the stator winding is of a polyphase design, the stator comprising:
   a printed circuit board of a ceramic material for interconnecting the phase windings.

10. Electric motor according to claim 9, wherein the printed circuit board is adjacent to the winding support, wherein the supporting sleeve extends over a complete length of the stator winding and the winding support and positively lies against the printed circuit board in an axial direction.

11. Electric motor according to claim 10, wherein the circuit board is perpendicular to the supporting sleeve.

12. Electric motor according to claim 9, wherein the stator winding is a three-phase design.

13. Electric motor according to claim 1, wherein the rotor is designed as an internal rotor.

14. Electric motor according to claim 1, wherein the supporting sleeve consists of zirconium oxide.

15. Electric motor according to claim 1, wherein the stator comprises:
   a winding support, wherein the winding support is disposed at a front face of the stator winding and consists of zirconium oxide.

16. Electric motor according to claim 1, wherein the stator winding has a uniform thickness in a direction parallel to the radial direction of the rotor.

* * * * *